Patented June 21, 1949

2,474,046

UNITED STATES PATENT OFFICE 2,474,046

PROCESS OF PRODUCING LACTIC ACID

Karl W. Fries, Rhinelander, Wis., assignor to Rhinelander Paper Company, Rhinelander, Wis., a corporation of Wisconsin No Drawing. Application October 19, 1945, Serial No. 623,431

3 Claims. (Cl. 195—48)

This invention relates to a process for producing lactic acid from waste liquor such as is obtained in the sulphite process for the production of pulp.

In the sulphite process for making pulp, whether the acid or neutral process is used, a waste liquor is obtained that contains sulphur dioxide either in a free, dissolved state, or else in a combined state. If limestone is used in the preparation of the sulphite cooking acids, the sulphur dioxide in the waste liquor will be largely in the form of calcium bi-sulphite. On the other hand, if a dolomitic limestone is used in the acid making process, both calcium and magnesium sulphites will be present in the waste liquor. In addition, the waste sulphite liquor contains organic matter, largely in the form of lignin compounds, and a small percentage of reducing sugars. Ordinarily, the reducing sugar content of waste sulphite liquor that has been produced in the pulping of soft woods, such as spruce, fir and hemlock, will amount to between 2 and 3% by weight, largely made up of hexoses and pentoses.

My present invention is directed to a process for the conversion of these sugars into lactic acid. I have found that if the sulphite waste liquor is first suitably treated to eliminate free and combined sulphur dioxide, the sugar content of the waste liquor, without being first concentrated, can be converted into lactic acid and the lactic acid can then be recovered therefrom, either as lactic acid itself or as calcium lactate. By the selection of a proper lactobacillus, the pentoses, as well as the hexoses, present in the waste liquor can be converted into lactic acid with good yields. Since the fermentation of the pentoses results in the formation of some acetic acid, along with the lactic acid, acetic acid can also be recovered from the waste sulphite liquor treated in accordance with my process. However, my process will be described in connection with its primary purpose of producing lactic acid, or calcium lactate, from sulphite waste liquor.

The removal of the free and combined sulphur dioxide from the sulphite waste liquor may be accomplished in several ways, as by adding sufficient lime to bring the pH of the waste liquor to around 12.5 to effect precipitation of both calcium sulphite and lignin compounds, or by adding only sufficient lime to bring the pH value to around 7.5 to 9.5 to effect a precipitation of the calcium sulphite only. Either of these steps may be preceded by steaming the sulphite waste liquor, either with or without the addition of an acid such as sulphuric acid, to steam-strip sulphur dioxide from the liquor. Those steps, or a combination of them, removes sufficient free and combined sulphur dioxide from the sulphite waste liquor to reduce the sulphur dioxide content below the toxic level for the particular lactobacillus used in the fermentation process.

The lactobacillus that I prefer to use is a species designated as *L. plantarum*. Several strains of this species may be satisfactorily employed, such as the strains *L. pentosus* and *L. arebinosus*. These strains effect the conversion not only of the hexoses but also of the pentoses present in the sulphite waste liquor and give good yields of lactic acid for relatively short fermentation periods. Since these lactobacilli require large amounts of organic nitrogen compounds, it is necessary to supply nutrients that furnish such organic compounds. Malt sprouts and corn steep liquor have been found best adapted for use as nutrients.

To secure the best results, the fermentation step is carried out at a temperature between 25 and 45° C., preferably at around 35 to 37° C., and the pH is maintained between 6.3 and 6.7, preferably at 6.5, throughout the entire fermentation action. Calcium carbonate may be added, if necessary, to neutralize the acidity of the lactic acid formed, thereby converting the lactic acid into calcium lactate.

At the end of the fermentation step, the lactic acid can be recovered from the liquor by extraction with a suitable solvent such as isophorone, butyl lactate, an amyl alcohol, or other suitable organic solvent. Alternatively, the lactic acid can be methylated to form the methyl ester of lactic acid and the ester recovered in any suitable manner.

It is therefore an important object of this invention to provide a commercially practical method of producing lactic acid from sulphite waste liquor by effecting the fermentation of the sugars present into lactic acid and recovering the lactic acid so produced.

It is a further important object of this invention to provide an economical method for the production of lactic acid from sulphite waste liquor, in accordance with which both the pentoses and hexoses present in the sulphite waste liquor are converted into lactic acid by means of a lactobacillus of the strain *L. plantarum*, with a good yield.

Other and further important objects of this invention will become apparent from the following description and appended claims.

As previously stated, the starting material in my process is sulphite waste liquor as obtained from pulp mills using either the acid or neutral sulphite process for the pulping of wood. While the composition of the waste liquor will vary depending upon the type of wood being treated and the particular sulphite process that is used, the liquor as it comes from the digesters will usually have a total solids concentration of between 10 and 14% by weight, on an oven dry basis. The reducing sugar concentration of the liquor runs, in general, between 2 and 3% by weight, calculated as dextrose. Due to the presence of free sulphur dioxide and organic acid, the waste liquor, as produced by the acid sulphite process, will be on the acid side. Whether produced by the acid or the neutral sulphite process, the waste liquor will contain sulphur dioxide in combined form, either in combination with calcium or magnesium as calcium bi-sulphite or magnesium bi-sulphite, or as the neutral sulphites, and also probably in loose combination with the lignins that are always present in sulphite waste liquor.

In order to remove the free and combined sulphur dioxide present in the sulphite waste liquor, or at least reduce the total sulphur dioxide concentration below the toxic limit for the particular lactobacillus employed in the fermentation step, lime may be added to bring the liquor on the alkaline side and cause the precipitation either of the calcium sulphite so formed alone, or of both the calcium sulphite and lignin compounds. Prior to the addition of lime, steam may be passed through the sulphite waste liquor as it flows downwardly through a column in order to strip the free $SO_2$ from the liquor. If desired, an acid such as sulphuric acid may be first added to the sulphite waste liquor to aid in the stripping of the sulphur dioxide during the steaming step, but I have not found that such addition of acid produces commensurable benefits in carrying out the subsequent steps of the process.

If only the inorganic sulphur dioxide compounds are to be removed, sufficient lime, preferably calcium hydroxide, is added to bring the pH up to about 8.5 or within the range of from 7.5 to 9.0. A preferable range is between 8.0 and 8.8 if it is desired only to precipitate the free and some of the loosely combined $SO_2$ as calcium sulphite. The same range is applicable in case a dolomitic limestone has been used in the preparation of the cooking acid from which the sulphite waste liquor has been obtained as a result of the cooking step. If, on the other hand, it is desired to precipitate the lignin compounds as well as the inorganic sulphites, sufficient lime is added to the sulphite waste liquor to bring the pH up to about 12.5. In either case the lime is well mixed with the waste sulphite liquor, as by means of agitation, until the desired pH has been reached, after which the liquor is allowed to stand to give sufficient time for the calcium sulphite, and organic compounds if the more alkaline pH is reached, to flocculate and precipitate. If the temperature of the waste liquor during the flocculation and precipitation periods is 35° C. or above, the settling time should not be allowed to exceed 1½ hours, since extended exposure of the sugars to high alkalinity at elevated temperatures results in a degradation of the sugars, probably due to polymerization or resinification. If the temperature is lower than about 35° C., however, the settling time may be increased considerably. For instance, at a temperature of 20° C., the standing time can be as much as 24 hours without appreciably more degradation of the sugar than would occur over a 1½ hour standing time at 35° C.

During the settling period, the pH of the liquor drops slightly, apparently due to the liberation of some sulphur dioxide from the sulphonated lignins. At the end of the settling period, the precipitate is filtered off, or otherwise removed, and the clear liquor then subjected to the fermentation step about to be described.

Before subjecting the liquor to the fermenting action of lactobacilli, the pH of the liquor is reduced to between 6.3 and 6.7, with a pH of 6.5 as optimum. The reduction in the pH may be effected by means of any suitable acid, such as sulphuric acid, or by passing carbon dioxide gas through the liquor. Inasmuch as the subsequent fermentation step is anaerobic, it is not desirable to aerate the liquor after the settling step, so that vigorous agitation is avoided in the addition of any acid, and if $CO_2$ is passed through the liquor for the purpose of reducing the pH, care should be taken not to have any appreciable amount of air or oxygen mixed with the $CO_2$.

The fermentation itself is best carried out at a temperature of around 35° C., or between 35 and 37° C., and, in any event, within the broader range of from 25 to 45° C. The pH during the fermentation step is kept between 6.3 and 6.7, with an optimum of 6.5, calcium carbonate being added, if necessary to prevent the pH from dropping due to the formation of free lactic acid as a result of the fermentation process. The length of the fermentation period will depend on the particular culture used and upon the extent to which the conversion of sugars to lactic acid is carried. In general, a fermentation period of several days has been found necessary if reasonably complete conversion of the sugars into lactic acid is desired.

Since the sulphite waste liquor contains very small amounts of organic nitrogen compounds, or other substances necessary to the growth of the lactobacilli used, it is necessary to supply a source of nutrient substances with the lactobacillus culture that is added to the sulphite waste liquor to effect fermentation of the sugars.

The cultures found most successful in the fermentation step fall in Bergey's classification under *Lactobacillus plantarum*. *L. pentosus* and *L. arabinosus* are the best strains thus far found for the purpose of my process. Of the various cultures tried, *L. pentosus* strain No. 124–2 has given the best results. An inoculum containing this lactobacillus and all of the nutrients required may be prepared in various ways, as will now be described.

Malt sprouts, malt mash, corn steep liquor and various other sources of nitrogen may be used as the nutrient. Malt sprouts have been found most satisfactory, and particularly so if the malt sprouts are steeped for ten or twelve hours at around 45° C., and the steeped sprouts then sterilized. It has been found preferable to sterilize the steeped malt sprouts separately, rather than in the presence of the sulphite waste liquor. The yield of lactic acid is about 10% higher when sterilization is carried out separately.

The proportion of inoculum that should be added to the sulphite waste liquor may be varied considerably, but if the best yield possible is to be obtained, about ½% by weight, based upon the amount of malt sprouts present in the inoculum, should be added to the sulphite waste liquor, the percentage being expressed by weight of the waste liquor being treated. As previously stated, lime, preferably in the form of calcium carbonate, may be added to the fermentation mass as the action progresses in order to maintain the pH of the mass at around 6.5. The temperature during the fermentation step is kept preferably at between 35 and 37° C., or at least within the range of from 25 to 45° C. The time of the fermentation step will vary between about eight hours and five days, but usually requires as much as three days for the substantially complete conversion of the sugar content of the waste liquor into lactic acid. Yields equivalent to a 70° conversion are obtainable by the use of my process.

In the preparation of the sulphite waste liquor for the fermentation step, the influence of varying pH values at the time of precipitation on the yield of lactic acid can be seen from the following comparisons:

|  | Per cent |
|---|---|
| pH 7.4—Lactic acid produced after 5 days | 0.62 |
| pH 7.7—Lactic acid produced after 5 days | 0.70 |
| pH 8.2—Lactic acid produced after 5 days | 0.83 |
| pH 8.55—Lactic acid produced after 5 days | 1.07 |
| pH 8.80—Lactic acid produced after 5 days | 0.78 |
| pH 9.20—Lactic acid produced after 5 days | 0.49 |

In the above table the percentage given for the lactic acid is the percentage by weight of lactic acid in the waste liquor at the end of the fermentation period. It will be seen from this table that control of the pH value in the precipitation step is fairly critical, the optimum pH being around 8.5. This optimum will vary somewhat depending upon the temperature at which precipitation and settling are carried out, but, in general, if the temperature is within the range of between 35 and 50° C., or higher, the pH should be kept below 8.8 and the time of standing between the addition of lime and the filtering off of the calcium sulphate should not run over 1½ hours. If the temperature is below 35° C., a somewhat higher pH value is permissible and the time of standing may be considerably increased.

At the end of the fermentation step, the lactic acid in the fermented waste liquor will be largely present as calcium lactate. Several methods of recovering the calcium lactate as lactic acid can be used.

The recovery of the lactic acid is preferably effected by hydrolyzing the calcium lactate with sulfuric acid and recovering the lactic acid by means of an organic solvent, such as isophorone, butyl lactate, mesityl oxide amyl alcohol, or other primary, secondary or tertiary alcohols. A countercurrent solvent extraction is preferable, in accordance with which the weak solution of lactic acid is allowed to flow downwardly through a column while the solvent is allowed to pass upwardly through the column due to its lighter specific gravity. Prior to running the lactic acid through the column, the calcium sulfate formed during the hydrolyzing of calcium lactate is removed by sedimentation or is filtered off. The solvent solution of the lactic acid formed during the upward passage of the solvent is allowed to overflow or flow out at a point in the column above that at which the weak lactic acid solution is introduced into the column. The lactic acid can then be removed from the solvent by distilling off the solvent.

It is also possible to recover the lactic acid from the fermented waste liquor by a process such as is used in the production of lactic acid by the fermentation of whey after the removal of casein, or of molasses, or of hydrolyzed corn starch. The fermented liquor containing the calcium lactate is first condensed sufficiently to start the formation of crystals. This may suitably be done in a vacuum pan. The condensed liquor is transferred from the vacuum pan into a crystallizing vat, where larger crystals are formed. From the crystallizing vat, the liquor containing the crystals is flowed into centrifuges to separate the mother liquor from the crystals. The crystals are then dissolved in a small amount of water and the water evaporated again to produce crystals of higher purity. Next, the crystals are centrifuged and again dissolved. The resulting solution is passed through a filter bed containing a decolorizing material that may include activated carbon. After passing through the filter bed, the solution is passed through a filter press to remove any suspended decolorizing material or activated carbon. The filtered calcium lactate liquor then goes to another evaporator, to a crystallizer, and thence to a centrifuge, from which U. S. P. calcium lactate is separated out from the mother liquor. The calcium lactate can either be sold as such, or if the free lactic acid is desired, the calcium lactate can be hydrolyzed with sulfuric acid to form free lactic acid and calcium sulphate. In the latter case, the calcium sulphate is separated from the dilute lactic acid solution by filtration. The dilute solution of lactic acid is then agitated in a tank with activated carbon, the solution evaporated to effect crystallization of lactic acid and the lactic acid filtered off. The lactic acid so obtained is U. S. P. grade and water-white.

Alternatively, the lactic acid in the fermented and concentrated sulphite waste liquor can be converted into its methyl ester by treatment with methyl alcohol and the ester then distilled off from the weak solution.

My process thus provides for the production of lactic acid from sulphite waste liquor, thereby obtaining a valuable product from what has heretofore been considered as presenting a serious problem of waste disposal. Owing to the fact that the biological oxygen demand of the sulphite waste liquor is considerably reduced as the result of my process, the final disposal of the waste liquor after treatment to recover the lactic acid content therefrom presents no serious problem, since the liquor is no longer harmful to animal and plant life if discharged into a river or other body of water. The yield of lactic acid in accordance with my process is such that for every one hundred thousand gallons per day of waste liquor obtained from a sulphite mill, approximately fifteen thousand pounds of lactic acid per day can be produced. The lactic acid so produced is of technical purity and useful in the preparation of various chemicals, such as sodium lactate, acrylic acid derivatives, and others, as well as being valuable in the form of lactic acid itself or calcium lactate.

It will, of course, be understood that various details of the process may be varied through a wide range without departing from the principles of this invention, and it is, therefore, not the purpose to limit the patent granted hereon otherwise than necessitated by the scope of the appended claims.

What I claim is:

1. The method of producing lactic acid from waste sulphite liquor containing lignins, sugars and free and loosely combined sulfur dioxide, which comprises adding sufficient lime to said waste liquor to effect a pH therein of between 8.0 and 8.8, thereby causing the precipitation of said free and loosely combined sulfur dioxide, as calcium sulfite, allowing the lime-treated mass to stand for a time not exceeding 1½ hours if the temperature of said mass is above 35° C., separating the resulting precipitate from the liquor, adjusting the liquor to a temperature between 30° and 40° C. and to a pH between 6.3 and 6.7, adding to said liquor an inoculum of Lactobacillus pentosus 124-2 and a nutrient therefor, maintaining said inoculated liquor within the temperature and pH limits last mentioned until a substantial conversion of said sugars to lactic acid has occurred, and recovering the lactic acid so produced.

2. The method of producing lactic acid from waste sulphite liquor containing lignins, sugars and free and loosely combined sulfur dioxide, which comprises adding sufficient lime to said waste liquor to effect a pH therein of about 8.5 thereby causing the precipitation of said free and loosely combined sulfur dioxide as calcium sulfite, allowing the lime-treated mass to stand for a time not exceeding 1½ hours if the temperature of said mass is above 35° C., separating the resulting precipitate from the liquor, adjusting the liquor to a temperature of about 35° C. and to a pH of about 6.5, adding to said liquor an inoculum of Lactobacillus pentosus 124-2 and a nutrient therefor, maintaining said inoculated liquor within the temperature and pH limits last mentioned until a substantial conversion of said sugars to lactic acid has occurred, and recovering the lactic acid so produced.

3. The method of producing lactic acid from waste sulphite liquor, which comprises adding sufficient lime to said waste liquor to effect a pH therein of above 8.0 and cause the precipitation of free and loosely combined sulfur dioxide as calcium sulphite, allowing the resulting mass to stand at a temperature between 35 and 50° C. for a time not over one and one-half hours to effect flocculation and settling of the calcium sulphite without causing substantial degradation of the sugars present, separating the precipitate so formed from the liquor, adjusting the liquor to a temperature between 25 and 45° C. and to a pH between 6.3 and 6.7, adding to said liquor an inoculum of Lactobacillus pentosus 124-2 and sterilized malt sprouts as a nutrient therefor, maintaining said inoculated liquor within the temperature and pH limits last mentioned for approximately three days' time, acidifying the resulting liquor to convert any calcium lactate present into lactic acid, extracting said lactic acid with an organic solvent therefor, said solvent being substantially insoluble in water and distilling off the solvent from the lactic acid solution so formed to recover the lactic acid.

KARL W. FRIES.

REFERENCES CITED

The following references are of record in the file of this patent:

UNITED STATES PATENTS

| Number | Name | Date |
|---|---|---|
| 1,952,643 | Wallace | Mar. 27, 1934 |
| 2,217,786 | Birt et al. | Oct. 15, 1940 |